Feb. 13, 1923.

E. HUBBARD ET AL 1,444,791

SPRING WHEEL

Filed Nov. 7, 1922

WITNESSES

Elmo Hubbard,
John Bahrs,
INVENTOR.

BY
ATTORNEYS.

Feb. 13, 1923.
E. HUBBARD ET AL
1,444,791
SPRING WHEEL
Filed Nov. 7, 1922
5 sheets-sheet 2
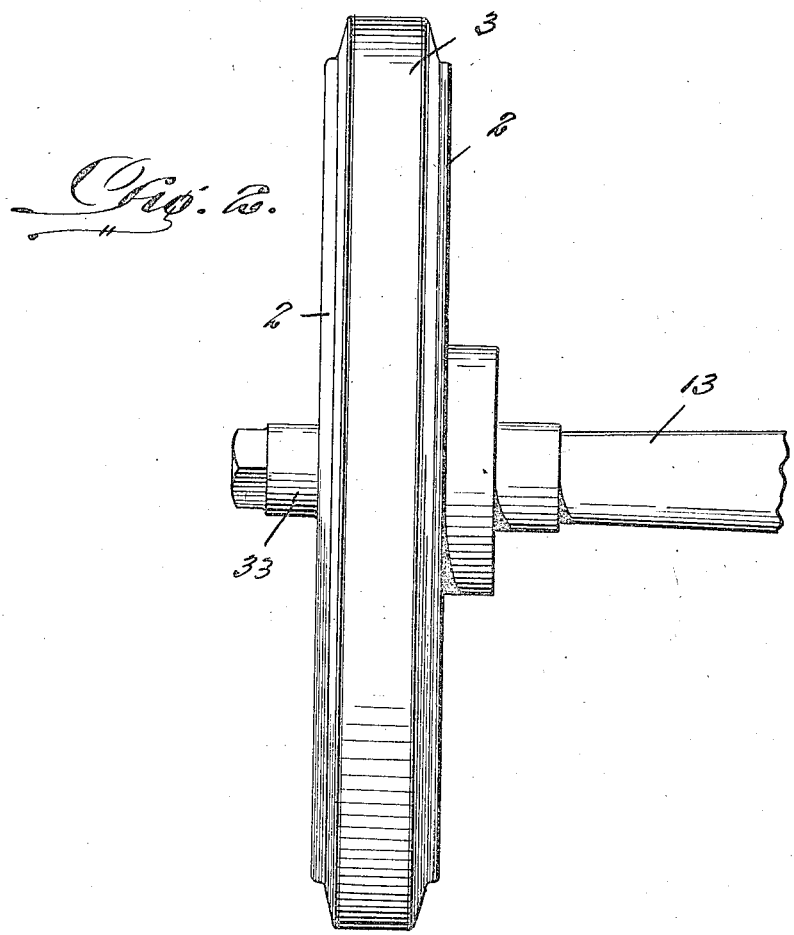
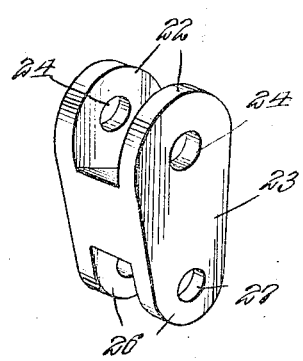
WITNESSES
Elmo Hubbard,
John Bahrs,
INVENTOR.
BY
ATTORNEYS.

Feb. 13, 1923.

E. HUBBARD ET AL 1,444,791

SPRING WHEEL

Filed Nov. 7, 1922

Elmo Hubbard
John Bahrs,
INVENTOR.

BY
ATTORNEYS.

WITNESSES

Feb. 13, 1923.

E. HUBBARD ET AL

SPRING WHEEL

Filed Nov. 7, 1922

WITNESSES

Elmo Hubbard,
John Bahrs,
INVENTOR.

ATTORNEYS.

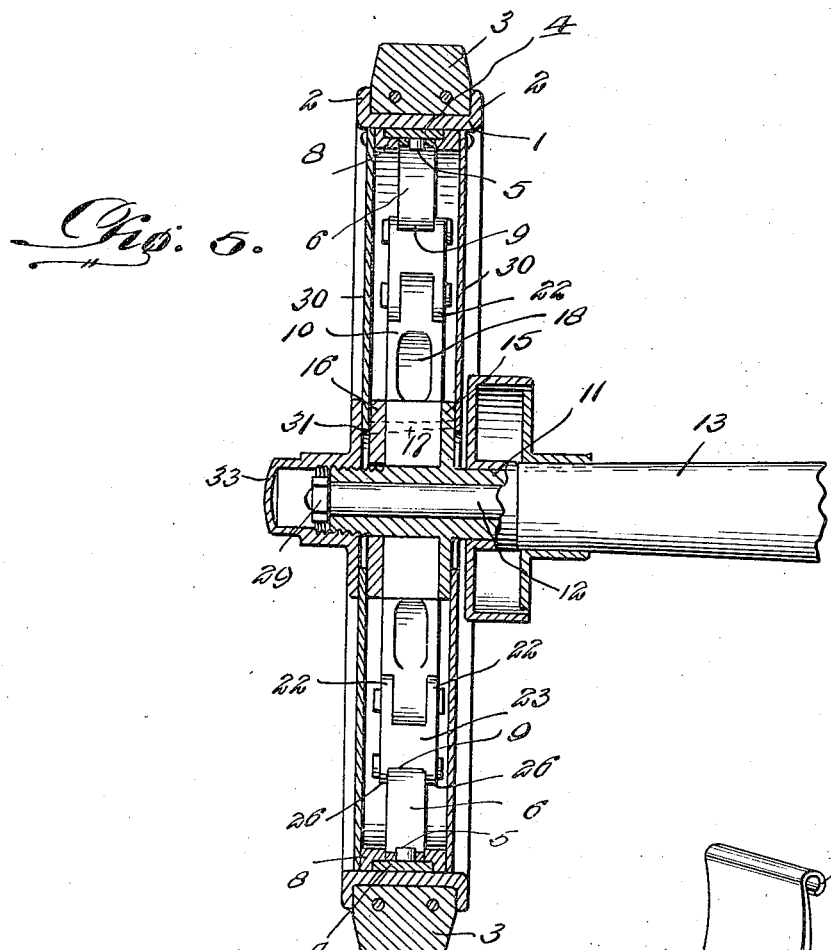

Patented Feb. 13, 1923.

1,444,791

UNITED STATES PATENT OFFICE.

ELMO HUBBARD AND JOHN BAHRS, OF AMARILLO, TEXAS, ASIGNORS OF ONE-FIFTH TO F. M. SANDS, OF AMARILLO, TEXAS.

SPRING WHEEL.

Application filed November 7, 1922. Serial No. 599,526.

*To all whom it may concern:*

Be it known that we, ELMO HUBBARD and JOHN BAHRS, citizens of the United States, residing at Amarillo, in the county of Potter and State of Texas, have invented certain new and useful Improvements in Spring Wheels, of which the following is a specification.

The present invention relates to new and useful Improvements for spring wheels for vehicles, and has for the primary object thereof, the provision of such a device that will effectively overcome the necessity of the use of pneumatic tires now almost universally employed upon motor vehicles.

A further object of the invention resides in the provision of a spring wheel for vehicles, wherein the same acts as a shock absorber between the vehicle body and axles, and further, wherein the same functions as a resistance to side thrusts and as a cushion to the rear axle when throwing in the vehicle clutch, thereby lessening the liability of breaking the axle or stripping the gears in the differential, in starting off at a jump.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 2 is an end elevational view of the same, the wheel being shown as properly supported upon an axle.

Figure 5 is a transverse sectional view upon the line 5—5 of Figure 4, and looking in the direction of the arrows.

Figure 6 is a perspective view of one of the spring plates employed by us in the present invention.

Figure 7 is a perspective view of one of the link members, pivotally secured to the outer end of each spoke for connecting these spokes through the instrumentality of the spring plates to the outer rim wheel.

Figure 1:
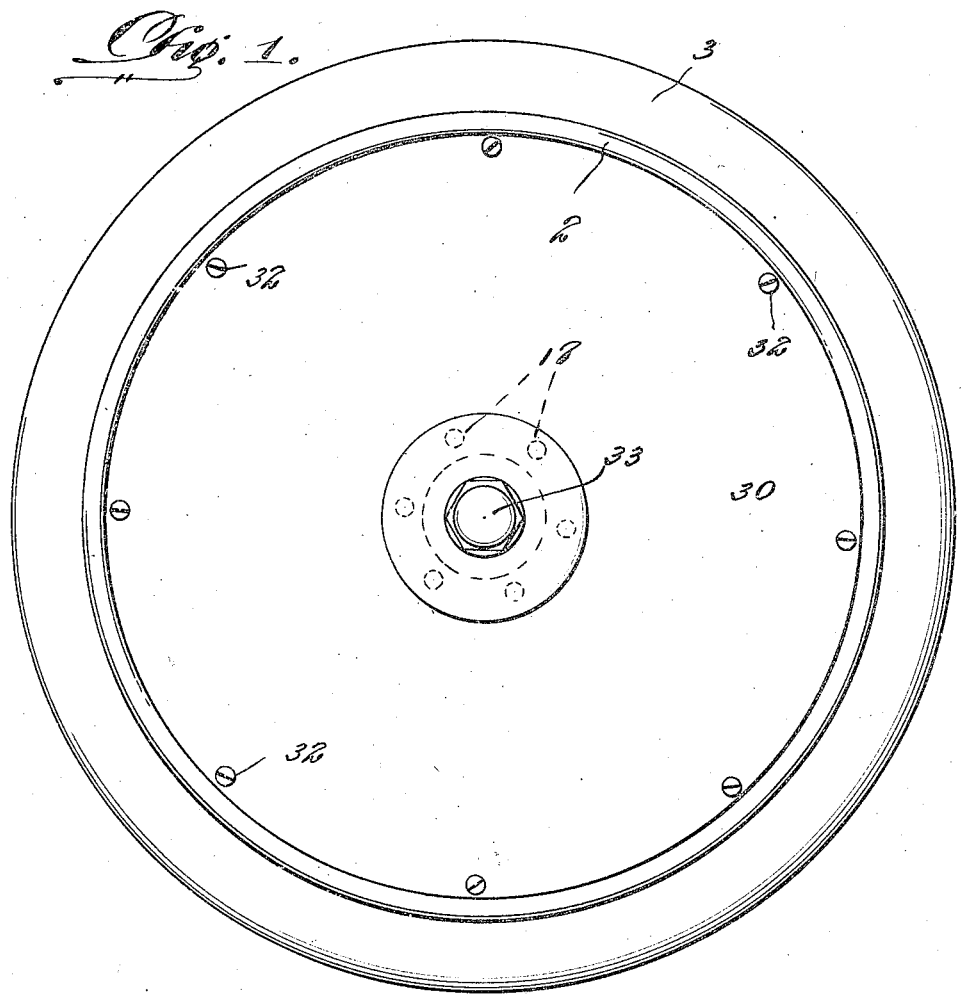
Figure 1 is a side elevational view of the spring wheel constructed in accordance with the present invention.
Figure 10:
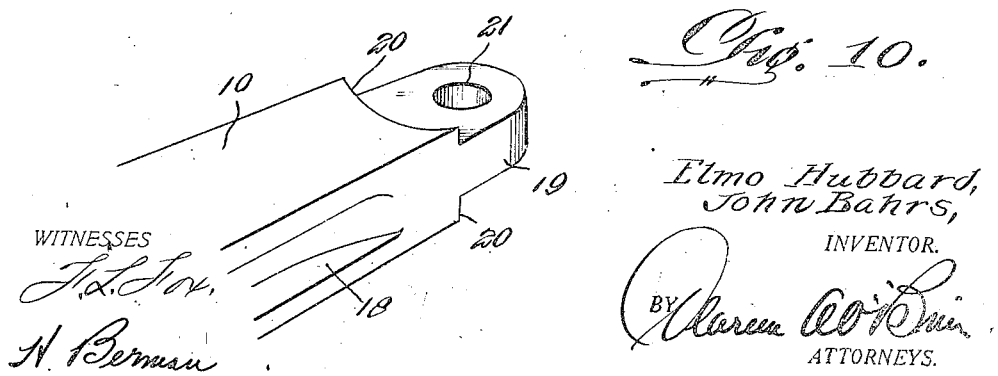
Figure 10 is a fragmentary perspective view of the outer end of one of the spoke members.
Figure 3:
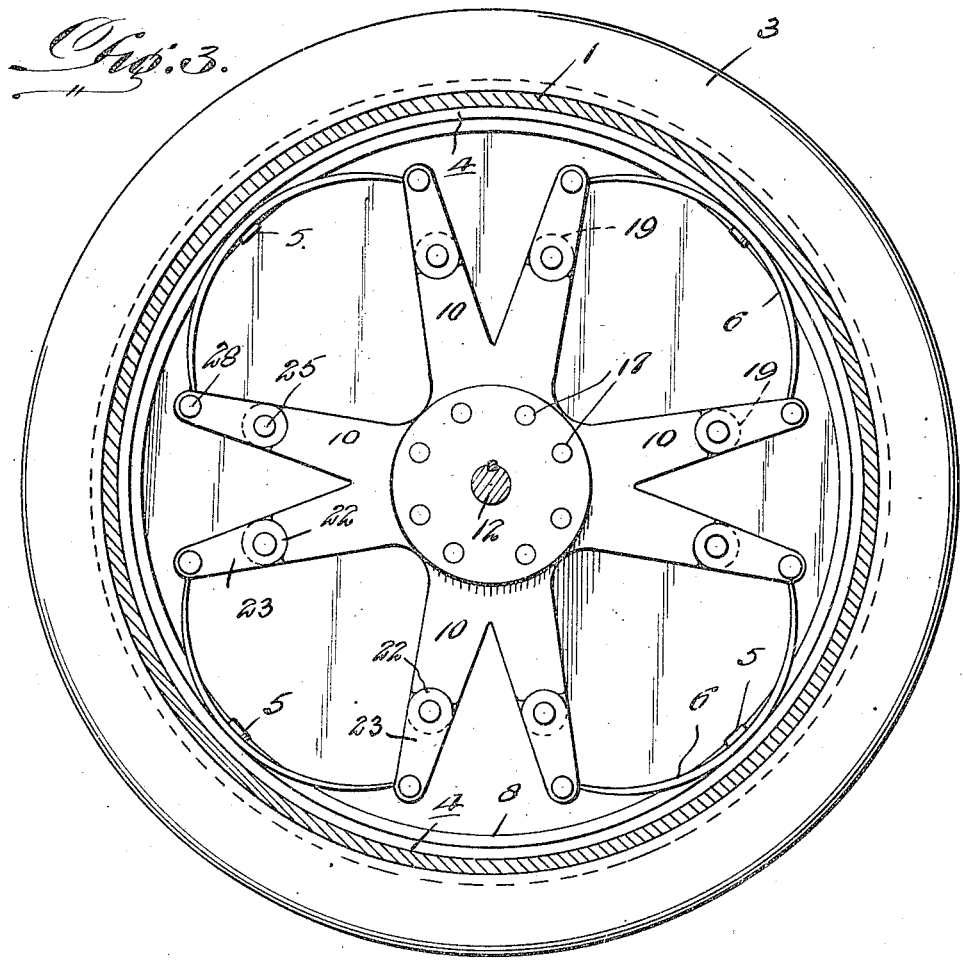
Figure 3 is a side elevational view, partly in cross section of the wheel with the outer protecting disk removed therefrom.

Referring to the drawings, there is shown a vehicle spring wheel, embodying an outer annular rim 1, having the usual vertical side flanges 2 for supporting therebetween a solid cushion tire 3, it being understood that the rim 1 may be of a flat band type, without the usual cushion tire disposed thereon.

Figure 8:
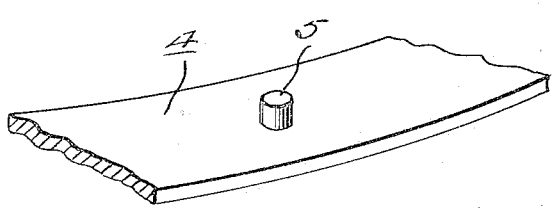
Figure 8 is a fragmentary perspective view of a portion of the spring engaging strip carried by or formed upon the undersurface of the vehicle rim.
Figure 4:
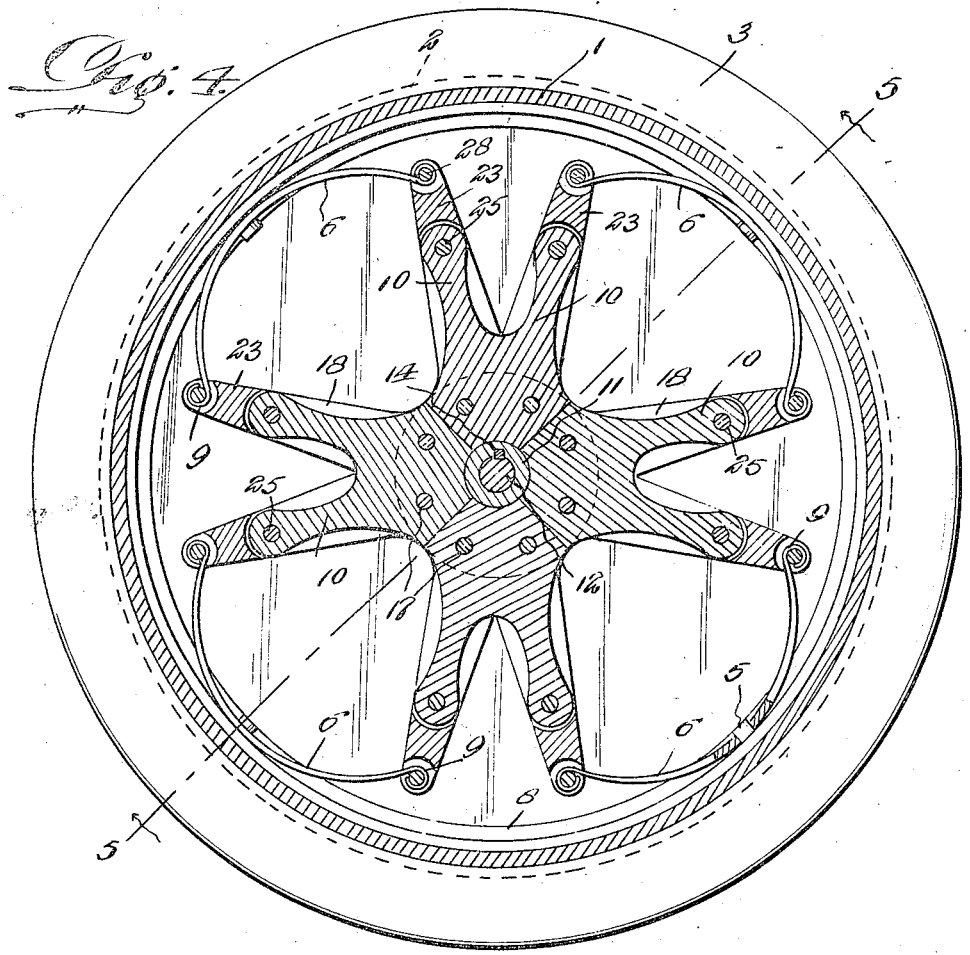
Figure 4 is a vertical cross sectional view through the wheel, shown in Figure 3.
Figure 9:
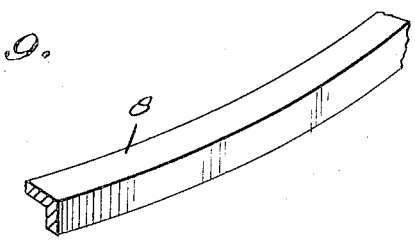
Figure 9 is a fragmentary perspective view of a portion of one of the angular-shaped retaining rings secured to the under surface of the rim for preventing side thrusts of the curved spring plate members.

With particular reference to Figures 4, 5 and 8, the under surface of the rim 1, is shown as having centrally disposed thereon by welding or the like, an annular band or ring 4 and formed centrally upon the outer face of this ring is a plurality of suitably spaced annular-shaped depending lug members 5 adapted to receive thereon a curved spring plate member 6, each of these plate members being suitably centrally perforated as at 7 for engagement upon the said lug members. As shown in Figure 5, there is formed upon or preferably secured to the under side of the rim 1, and adjacent the sides of the ring or band 4, angular-shaped securing rings 8, the inner edges of which are adapted for close contact with the adjacent edges of each of the curved spring spokes for preventing any side movement of these springs upon the lugs 5. The construction of these retaining rings is more clearly shown in Figure 9. The ends of each of the curved spring plate members 6 are so rolled as to provide transversely extending bolt receiving eyes 9 in the opposite ends thereof. These ends of the springs are adapted to be secured to the outer ends of the wheel spokes in a manner hereinafter described.

Spoke members 10 are formed in pairs of two each as more clearly shown in Figure 4, each of these pairs of spokes being in the form of a metallic casting or the like, and the lower side edges of each pair of spokes are so formed as to have close contact with the similar formed edges of the adjacent pairs of spokes, and the bottom edges thereof are suitably curved as to provide an annular opening between the spokes for the reception of a transversely extending sleeve 11, the reduced end 12 of the axle 13 adapted to engage therethrough to be retained therein by the transversely extending retaining key 14. Inwardly of the outer end of the sleeve 11, the same has formed thereon an annular plate or flange 5 for close contact with the inner sides of the spoke members 10 and loosely positioned upon the outer end of the sleeve 11 is a similarly-shaped plate 16, whereby through the medium of bolts 17, the said plates 15 and 16 and spokes 10 are rigidly secured together for purposes readily apparent.

The side edges of each of the spokes 10 are channeled out as at 18 for creating lightness to the wheel, and the outer end of each of the spokes are reduced as at 19 for effecting curved side flanges 20 inwardly of the ends thereof. The extreme outer end of the reduced portion 19 of each spoke is curved as shown and these reduced ends of the spokes have transverse annular bores 21 extending therethrough. Pivotally secured to the reduced outer ends of each of the spokes are the inner enlarged ends 22 of a short link section 23. These enlarged ends 22 of each of the links are curved in a manner similar to the curved shoulder 20 of the spokes and are eyed as at 24 for alinement with the bore 21 of the spokes for receiving the pivot pin 25. The outer reduced ends 26 of each of the said link members are also eyed as at 27 and between these ends 26 of the links are received the adjacent ends of the curved spring plates 6 to be pivotally retained between these ends of the links by retaining pins 28.

The formation of each pair of spoke members 10 is such that the distance between adjacent spokes of each pair thereof is greater than the distance between each of the spokes of the pair, and as clearly shown, the curved spring members 6 are adapted for connection to the link members 23 carried by adjacent ones of the spoke members of different pairs.

The outer end of the reduced portion 12 of the axle 13, is screw threaded to receive thereon a binding nut 29 as more clearly shown in Figure 5, and if desirable metallic shields 30 may be secured to both sides of the wheel for preventing dirt or the like from engaging upon the spokes and their associated parts. As shown, each of these shields 30 are provided with a central annular opening 31 for allowing the same to engage over the sleeve 11, and the outer ends of the shields 30 lie adjacent the angular shaped retaining rings 8 to be there secured by set screws or the like 32.

The assembled wheel is retained upon the reduced portion of the axle 13 by the above described wedge nut 29, and the outer end of the sleeve 11 is screw threaded for receiving the internal screw threaded end of a hub cap 33.

From the above description, it is believed by us that the operation, and advantages of the present spring wheel will be readily apparent to those skilled in the art, whilst we have entered into a detailed description of this wheel, it is nevertheless to be understood that minor changes may be made therein without departing from the spirit and scope of the invention as claimed.

What we claim as new is:—

In a spring wheel, a rim, a plurality of pairs of spoke members, a link section pivotally secured to the outer end of each spoke and in normal vertical alinement therewith, a curved spring plate being so formed as to provide eye portions at the opposite ends thereof, and adapted to be secured to the outer end of adjacent links upon adjacent pairs of spokes, and angular-shaped rings at opposite sides of the spring plates and secured to the said rim for preventing side movement of the said plates.

In testimony whereof we affix our signatures.

ELMO HUBBARD.
JOHN BAHRS.